W. H. SWOGGER.
Churn Power.

No. 220,041. Patented Sept. 30, 1879.

Witnesses.
A. Ruppert
James H. Lange.

Inventor:
William H. Swogger.
per Edson Brothers
Attorneys.

UNITED STATES PATENT OFFICE.

WILLIAM H. SWOGGER, OF NEW WILMINGTON, PENNSYLVANIA.

IMPROVEMENT IN CHURN-POWERS.

Specification forming part of Letters Patent No. 220,041, dated September 30, 1879; application filed August 22, 1879.

*To all whom it may concern:*

Be it known that I, WILLIAM H. SWOGGER, of New Wilmington, in the county of Lawrence and State of Pennsylvania, have invented certain new and useful Improvements in Churn-Powers; and do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1:
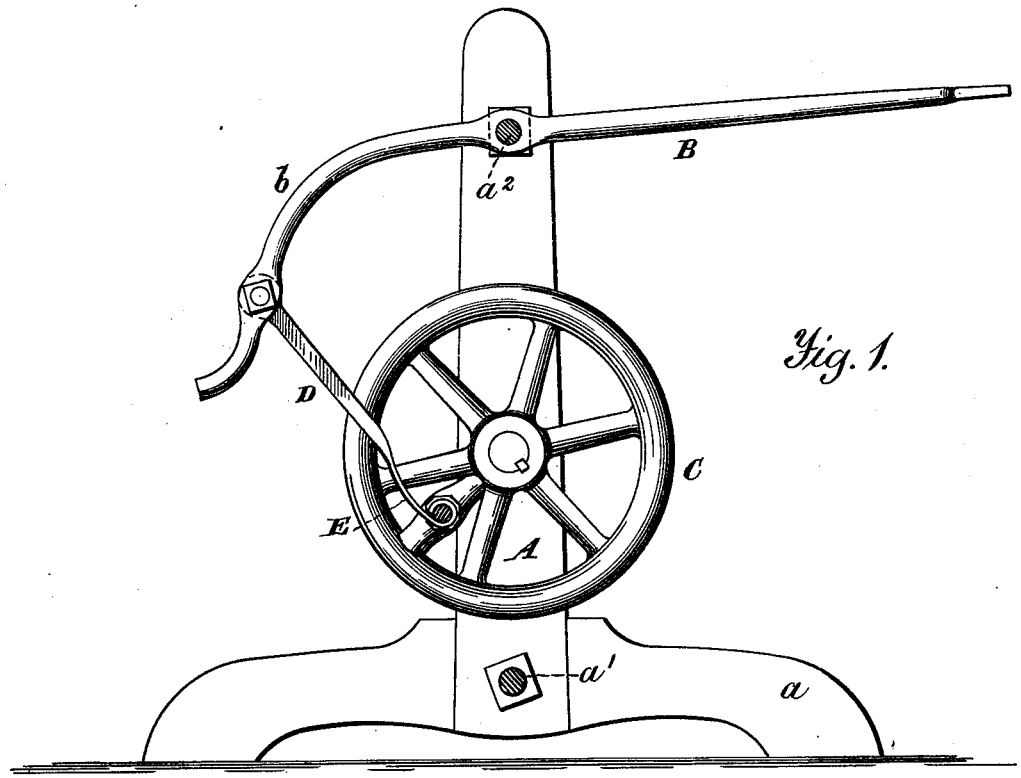
Figure 2:
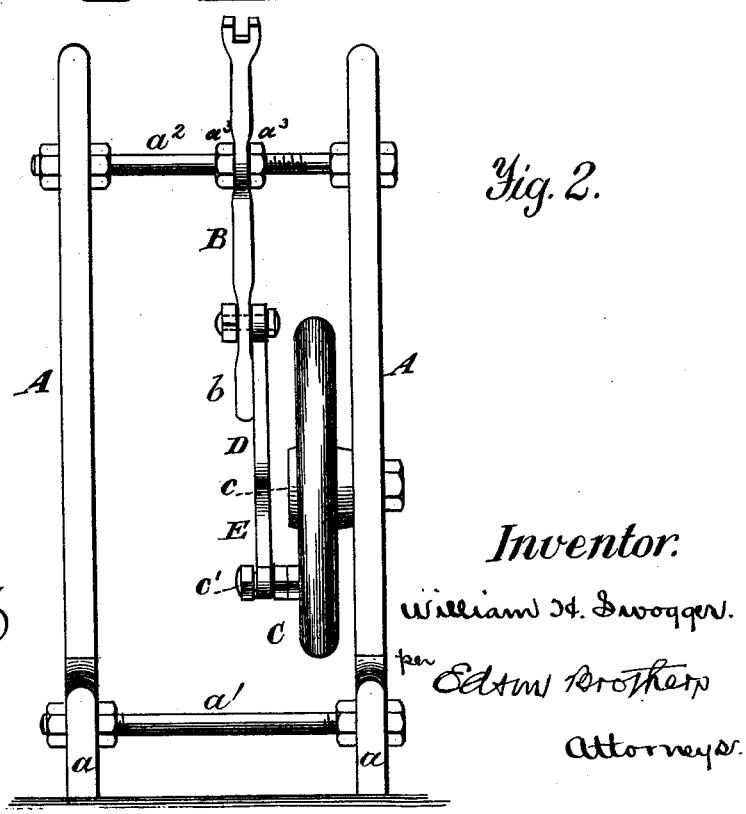

Figure 1 is a sectional elevation of my improved churn-power, and Fig. 2 is a front elevation of the same.

This invention has relation to improvements in churn-power mechanism for operating the churn or other operative device with greater facility and ease; and to these ends it consists of a lever adapted to be connected to the dasher-staff or the operating or running member of the device, and supported or fulcrumed upon a fixed cross-bar, with one arm curved downwardly and connected to a fly or balance wheel by a pitman with a curved spring, substantially as hereinafter more fully set forth.

In the accompanying drawings, A A mark two standards or uprights, with their lower ends bolted to suitable feet or supports $a$ by a rod, $a^1$, nutted to said uprights. These uprights are connected together at their upper ends by a similar rod, $a^2$, likewise nutted thereto. B is a lever, with one end adapted to be connected to the dasher-staff or running or operating member of the device it is desired to operate, and adjustably pivoted or hung upon the upper cross-bar or rod, $a^2$, between nuts $a^3$ a greater or less distance from its rear end, with said end curved downwardly, as at $b$, Fig. 1, to increase its leverage. C is a balance or fly wheel, with its axle or shaft $c$ hung in one of the uprights A, and provided with a wrist-pin, $c'$. This wheel, as is well understood, gives a certain amount of momentum to the machinery to which it is connected, as will be hereinafter pointed out.

D is a pitman, with one end connected to the lower end of the lever B, while its other end is connected to the wrist-pin $c'$ of the balance-wheel C by a curved spring, E, forming part of the pitman. The object of this spring is to give the pitman a limited degree of elasticity to overcome dead-center.

In lieu of the nuts on the cross-bars or rods $a^1$ $a^2$, sleeves of wood may be slipped on said rods and serve the same purpose as the nuts, and thus lessen expense and trouble to provide nuts. The upper block or sleeve of wood is notched or slotted to provide for the reception of the lever B, hung on the upper rod.

The operator, seated in position, grasps and moves the lever B up and down, which operates the dasher of the churn, or the operating member of the device to be operated, the wheel C facilitating its movement and lessening the effort of the operator, with the dead-center compensated by the spring E.

Having thus fully described my invention, I claim and desire to secure by Letters Patent—

The combination of the uprights A, having the broad base $a$, rods $a^1$ $a^2$, curved lever B $b$, pivoted to rod $a^2$ between the nuts $a^3$, curved-spring pitman, and wheel C, all constructed and arranged as shown and described.

In testimony that I claim the foregoing I have hereunto set my hand this 9th day of August, 1879.

WILLIAM H. SWOGGER.

Witnesses:
 H. H. DINSMORE,
 GEORGE DILL.